Figure 1:
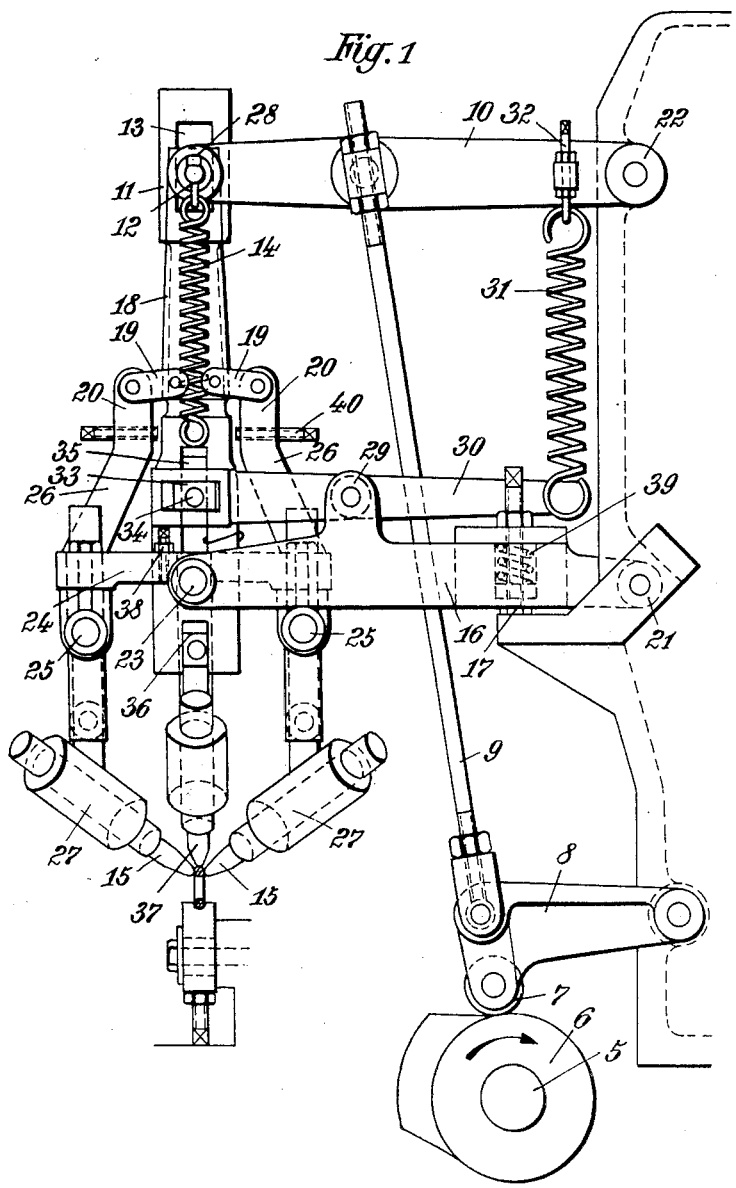

Oct. 16, 1951

P. ESSER ET AL 2,571,553

CHAIN WELDING MACHINE

Filed Oct. 31, 1949

2 SHEETS—SHEET 1

Inventors
P. Esser
P. Wilz
by
Glascock Downing Seubold
Attorneys

Oct. 16, 1951  P. ESSER ET AL  2,571,553
CHAIN WELDING MACHINE
Filed Oct. 31, 1949  2 SHEETS—SHEET 2

Inventors
P. Esser
P. Wilz
by
Glascock Downing (signature)
Attorneys

Patented Oct. 16, 1951

2,571,553

UNITED STATES PATENT OFFICE 2,571,553

CHAIN WELDING MACHINE

Paul Esser, Koln-Raderberg, and Peter Wilz, Koln-Bayenthal, Germany

Application October 31, 1949, Serial No. 124,594
In Germany March 22, 1949

7 Claims. (Cl. 219—4)

This invention relates to electric resistance butt-welding machines for chain links of the type employing more than four electrodes.

Of the known electric chain welding machines the older types throughout work with two electrodes for transmitting the welding current to the chain link to be welded. The heating of the compressed link ends up to welding heat takes effect very slowly since the areas with which the electrodes contact the chain limbs are small as well as unreliable and uncertain because of the inaccurate shape of the twisted link as well as due to the electrode surfaces having been impaired by burning away. To shorten the heating-up time and to increase in this way the output of the machine the supply of welding current has been distributed to various points on the chain link. This has led to the development of the four-electrode machines in which two pairs of electrodes are laterally applied in a pincer-like manner on either side of the weld to the limbs of the chain links which are to be welded together. Difficulties still arise here when supplying the welding current especially when welding heavier chains which are frequently made from rolled wire.

As has been shown for example in French Patent Specification No. 871,806, an arrangement with six electrodes has been provided and it was thought possible to work on similar lines, if necessary, with eight electrodes. It has however become apparent that this is not the case since the machine proposed for carrying into effect such a process in the suggested arrangement of its components was not sufficiently adapted to the various considerations which had to be taken into account in resistance-butt welding of chain links.

The present invention has for its object the development of a new welding machine by means of which it is possible to apply more than four electrodes to the ends of the chain link to be welded and to effect the application and the supply of current so reliably over such a great area and so near to the ends of the link that an appreciable reduction in working time as compared with the known chain-welding machines is obtained.

In a chain welding machine according to the invention the movement of the electrode is to be effected in a manner known per se by two parallel link motions attached on either side of the chain link to the frame of the machine each with two superposed levers on fixed pivots extending substantially horizontally.

The primary function of the upper horizontal levers according to the invention is to transmit the displacements of the parallel link motion, which is imparted by a control shaft, for instance through the medium of a push rod, to the various moving parts. The connecting levers extending between the superposed horizontal levers on fixed pivots, in turn serve for the support of side electrodes and in addition are provided with novel slide guiding means for a vertically movable upper electrode. Each connecting lever is attached to the corresponding upper horizontal lever through a pin-and-slot joint in which a pin on the upper horizontal lever moves in a slot provided in the upper end of the connecting lever. Under the effect of their weight, which may be partly counterbalanced according to the invention by the provision of any suitable spring or like resilient means these two parts take up such a position that each set of upper and lower horizontal levers tend to move apart and in this way the maximum effective length of the corresponding connecting lever tends to be used. The means provided according to the invention further include two or more pincer levers known per se which extend substantially parallel to each connecting lever and are pivotally mounted at the lower end thereof. As is known these pincer levers are connected with their upper horizontal lever through a toggle or like action and their free lower ends support the side electrodes. In this way, when one lower horizontal lever abuts against a stop device to be described in greater detail hereinbelow the movement of the lower lever and that of the corresponding connecting lever is arrested whilst the corresponding upper horizontal lever under spring action is further displaced in the slot in the connecting lever so that it approaches the lower lever. Thus the side electrodes are brought towards one another in pincer-like manner. Finally as has already been mentioned, at least one upper electrode is to be longitudinally adjustably mounted on each connecting lever and is to be forced downward under pressure. It is immaterial from the point of view of the invention whether the tension of a spring or springs is used for this purpose or whether the application of the upper electrode or electrodes is to be effected by the action of a weight or the like.

In further development of the invention it is desirable to limit the movement of the various interconnected levers by adjustable stops and to suit their adjustment to the particular dimensions of the chains to be welded. In the first place the use of adjustable stops is to be recommended which serve for lifting the connecting levers and at the same time prevent an excessive moving apart of the corresponding horizontal levers and their electrodes. A further abutment is to be provided to limit the movements of the lower horizontal levers which by reason of the longitudinal slots of the connecting levers are not positively dependent on the movement of the corresponding upper horizontal lever. The purpose of these stops is to ensure a further application of all the movable parts. Finally the arrangement of a stop or abutment is to be recommended between each connecting lever and its slide to limit the movement of the upper electrodes.

On lowering one of the connecting levers the upper electrode or electrodes is or are applied to the limb of the chain link and the slide-operating lever is at the same time lifted off the abutment screw so that the adjustable tension of the spring applied to the other end of the slide-operating lever takes full effect in forcing the electrode against the limb of the chain link. On lifting off the electrodes their movements are however to be limited.

The application of the upper electrodes can, as has already been mentioned, be effected in various ways. It is advisable to provide horizontal slide-operating levers which are subject to spring tension and force the slides and thereby the upper electrodes downwards. These levers can each be in the form of a one-armed lever pivoted on the machine frame. A better arrangement is however to link each lever to the corresponding lower connecting lever, it being again made in the form of a one-armed lever and provided with a tension spring attached to the lower connecting lever. It may also be made in the form of a two-armed lever and provided with a compression spring. By linking a slide-operating lever to the corresponding connecting lever it is inevitable that these two levers should be made of unequal lengths. The connection between each slide-operating lever and the slide itself in this case is to be effected so that it includes a longitudinal slot disposed in the slide-operating lever. Further instead of the compression spring applied to the two-armed slide-operating lever, a tension spring attached to the machine frame may be provided. A particularly good arrangement however results when each slide-operating lever is in the form of a two-armed lever and has a bearing at approximately the centre of the corresponding lower horizontal lever and its end next to the machine frame is attached to the corresponding upper lever through a tension spring. This spring may be adjustable.

The advantage of the described construction is that the machine comprises few parts only which are each of simple and light construction so that their movements are definite and precise. In this way the machine is made particularly reliable and it may be operated at high speed.

The hitherto known parallel guide has the drawback that only a short centre piece was provided which was mainly formed by the pincer device. The upper electrodes were adjustably and resiliently supported on this centre piece but were not capable of adjustment completely independently of the side electrodes.

Figure 2:
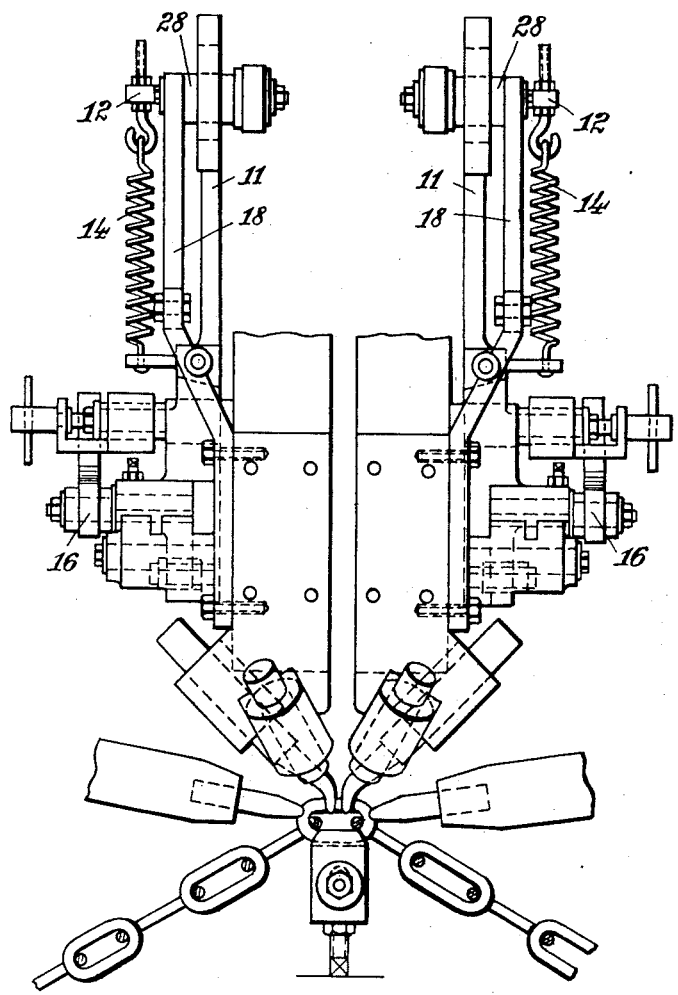

A constructional example of the invention is illustrated in the accompanying drawing wherein:

Fig. 1 shows the machine in side view; and Fig. 2 shows a corresponding front view.

A cam disc 6 is arranged on a control shaft 5 and through a roller 7 actuates a pivoted arm 8. A push rod 9 is linked to the arm 8 and at its upper end acts on the upper horizontal levers 10 of parallel link motions arranged on either side of the chain link. Each lever 10 has a pin 12 which passes through a longitudinal slot 13 in a substantially vertical connecting lever 11. A spring 14 whose tension is adjustable is attached to each of the levers 10 and 11 and ensures that, after the lower horizontal lever 16 of each parallel link motion has abutted against its adjustable set screw 17, the two lateral electrodes 15 are applied with a sufficient pressure against the limbs of the chain link by pulling down the levers 10 and auxiliary bars 18. Each connecting lever 11 has its lower end linked to the corresponding lower horizontal lever 16, which at the point 21 is pivoted on the machine frame in the same manner as the upper levers 10 at the points 22. The articulated joint 23 between each connecting lever 11 and the corresponding lower lever 16 is fixed in space. At this point each connecting lever 11 carries a cross piece 24 the two ends of which are formed with bushings 25. These bushings support two two-armed pincer levers 26, the lower free ends of which carry holders 27 in which the lateral electrodes 15 are longitudinally adjustably secured. The upper ends 20 of the pincer levers 26 are joined to the rods 18 by toggle link members 19. Bushings 28 at the upper ends of the rods 18 fit on the pins 12 of the upper levers 10 to which also the springs 14 are attached by one end.

Each lower horizontal lever 16 at or near its centre carries an upwardly extending projection with a bearing 29 for a two-arm slide-operating lever 30 extending parallel to the lower lever 16. One end of the lever 30 is joined to the upper lever 10 by a helical spring 31 and an adjustable screw attachment 32. The other end of the lever 30 extends across the connecting lever 11 and has a longitudinal slot 33 in which moves a slide 34. This slide moves in corresponding slots 35 and 36 in the connecting lever and carries an upper electrode 37 which is adjustable in the same manner as the two slide electrodes. The movement of the slide 34 relative to the connecting lever 11 is limited by a stop 38. Another stop 17 which is also adjustable and resiliently supported by the spring 39 limits the downward movement of the lower lever 16 and the connecting lever 11 linked therewith.

The pincer levers 26 carry abutment screws for limiting the angular movement of the lateral electrodes and at the same time for lifting the connecting lever 11.

The electrodes move in the following manner:

In the position shown, the electrodes bear against the chain link. On further rotation of the cam disc 6 in the direction of the arrow the push rod 9 together with the upper levers 10 are removed upwardly. Owing to the action of the spring 31 the levers 30 and the upper electrodes 37 for the time being remain in the position shown until the side electrodes 15 are rotated to such an extent that the abutment screws 40 bear against the connecting lever 11 and carry them along upwardly on further lifting of the levers 10. The upward movement of the connecting levers 11 causes the abutment screws 38 to be applied against the levers 30 to lift these levers, the slides 34 and the upper electrodes 37 attached thereto off the chain link. The chain link is thus released and can be moved away and be replaced by the next link.

We claim:

1. In an improved electric resistance butt-welding machine for chain links, the combination of a machine frame a cam shaft supported in the frame, two upper horizontal levers mounted with one end on fixed pivots on the machine frame and adapted to be vertically displaced by said cam shaft, two lower horizontal levers mounted with one end on fixed pivots on the machine frame below said upper horizontal levers, two substantially vertical connecting levers joined to the other ends of said superposed upper and lower horizontal levers to complete two parallel link motions on either side of a chain link to be welded, lost-motion joints between the upper horizontal levers and their connecting levers, two electrode supports depending from each connecting lever and attached through toggle means to the corresponding upper horizontal lever and adapted to move at least two side electrodes in pincer-like manner obliquely towards an upright chain link with the joint to be welded uppermost and at least one vertically slidable support at the lower end of each of said connecting levers for at least one upper electrode to be applied from above to either limb of the chain link.

2. A machine as specified in claim 1 comprising adjustable and resilient abutments on the machine frame for limiting the downward movements of the lower horizontal levers, the connecting levers and the side electrodes and their supports depending therefrom.

3. A machine as specified in claim 1 comprising an adjustable abutment on each connecting lever for limiting the lifting of the slidable upper electrode support.

4. A machine as specified in claim 1 comprising substantially horizontal slide-operating levers under spring tension extending with one free end across each connecting lever each said free end having a horizontal slot and the connecting levers each having a vertical slot and at least one slide engaged in each set of horizontal and vertical slots and supporting at least one upper electrode.

5. In an improved electric resistance butt welding machine for chain links, the combination of a machine frame, a cam shaft supported in the frame, two upper horizontal levers each mounted at one end on a fixed pivot on the machine frame, a push rod interconnecting the cam shaft and the said upper horizontal levers for vertical displacement of the latter, two lower horizontal levers each mounted at one end on fixed pivots on the machine frame below said upper horizontal levers, two substantially vertical connecting levers respectively connected through lost motion joints to the other ends of the upper horizontal levers and connected to the other ends of the lower horizontal levers to form two parallel link motions on either side of a chain link to be welded, two electrode supports depending from each connecting lever and mounting at least two side electrodes and connected through toggle means to the corresponding upper horizontal levers, said electrode supports being adapted to move said side electrodes in a pincers like manner obliquely towards a chain link in upright position with the joint to be welded uppermost, adjustable and resilient abutments on the machine frame and connected respectively to one of said sets of horizontal levers for limiting the downward movements of the lower horizontal levers, the connecting levers and the electrode supports carrying the side electrodes, substantially horizontal slide operating levers spring biased at one end extending across each connecting lever and each having a horizontal slot in its opposite end, said connecting levers each having a vertical slot in registration with the horizontal slot in the horizontal slide operating levers, at least one slide engaged in the registering slots in the horizontal slide operating levers and connecting levers, and at least one vertically slidable support at the lower end of each vertical connected lever and connecting to said slide for mounting at least one upper electrode to be applied from above to either limb of the chain link.

6. In an improved electric resistance butt welding machine for chain links, the combination of a machine frame, a cam shaft supported in said frame, two upper horizontal levers each mounted at one end on a fixed pivot on the machine frame, a push rod interconnecting the cam shaft and the upper horizontal levers for vertical displacement of the latter, two lower horizontal levers each mounted at one end on fixed pivots on the machine frame below said upper horizontal levers, two substantially vertical connecting levers respectively connected through lost motion joints to the other ends of the upper horizontal levers and connected to the other ends of the lower horizontal levers to form two parallel link motions on either side of the chain link to be welded, two electrode supports depending from each connecting lever and mounting at least two side electrodes and connected through toggle means to the corresponding upper horizontal levers, said electrode supports being adapted to move said side electrodes in a pincers like manner obliquely towards a chain link in upright position with the joint to be welded uppermost, substantially horizontal slide operating levers spring biased at one end extending across each connecting lever and each having a horizontal slot in its opposite end, said connecting levers each having a vertical slot respectively in registration with the horizontal slot in the horizontal slide operating levers, at least one slide engaged in the registering slots in the horizontal slide operating levers and connecting levers, and at least one vertically slidable support at the lower end of each connecting lever and connected to said slide for mounting at least one upper electrode to be applied from above to either limb of the chain link.

7. In an improved electric resistance butt welding machine for chain links, the combination of a machine frame, a cam shaft supported in the frame, two upper horizontal levers each mounted at one end on a fixed pivot on the machine frame, a push rod interconnecting the cam shaft and the said upper horizontal levers for vertical displacement of the latter, two lower horizontal levers each mounted at one end on fixed pivots on the machine frame below said upper horizontal levers, two substantially vertical connecting levers respectively connected through lost motion joints to the other ends of the upper horizontal levers and connected to the other ends of the lower horizontal levers to form two parallel link motions on either side of a chain link to be welded, two electrode supports depending from each connecting lever and mounting at least two side electrodes and connected through toggle means to the corresponding upper horizontal levers, said electrode supports being adapted to move said side electrodes in a pincers like manner obliquely towards a chain link in upright position with the joint to be welded uppermost, a double armed slide operating lever extending substantially parallel to each lower horizontal lever and pivoted thereto substantially at its center, one arm of said slide operating lever being connected by a tension spring to the corresponding upper horizontal lever and the other arm extending across the corresponding vertical connecting lever and being operatively connected thereto, and at least one vertically slidable support at the lower end of each vertical connecting lever for mounting at least one upper electrode to be applied from above to either limb of the chain link.

PAUL ESSER.
PETER WILZ.

REFERENCES CITED

The following references are of record in the file of this patent:

UNITED STATES PATENTS

| Number | Name | Date |
| --- | --- | --- |
| 2,239,114 | Olmstead | Apr. 22, 1941 |

FOREIGN PATENTS

| Number | Country | Date |
| --- | --- | --- |
| 234,198 | Germany | May 5, 1911 |
| 639,471 | France | Mar. 10, 1928 |